United States Patent [19]

Mowry

[11] Patent Number: 4,843,505
[45] Date of Patent: Jun. 27, 1989

[54] MAGNETORESISTIVE SENSING ELEMENT WITH A PROJECTION FOR ENHANCED DATA READING

[75] Inventor: Gregory S. Mowry, Burnsville, Minn.

[73] Assignee: Magnetic Peripherals Inc., Minnetonka, Minn.

[21] Appl. No.: 185,636

[22] Filed: Apr. 25, 1988

[51] Int. Cl.$^4$ .............................................. G11B 5/39
[52] U.S. Cl. ................................................... 360/113
[58] Field of Search ....................................... 360/113

[56] References Cited

U.S. PATENT DOCUMENTS

| | | | |
|---|---|---|---|
| 3,731,007 | 5/1973 | Masuda et al. | 360/113 |
| 4,613,918 | 9/1986 | Kanai et al. | 360/113 |
| 4,713,708 | 12/1987 | Krounbi et al. | 360/113 |
| 4,785,366 | 11/1988 | Krounbi et al. | 360/113 |

Primary Examiner—Robert S. Tupper
Attorney, Agent, or Firm—Edward P. Heller, III

[57] ABSTRACT

A thin film magnetic data transducer has for reading data a magnetoresistive sensing element with a projection not more than about 1.5 μm. long under at least one of the poles. The projection's tip is approximately flush with the end of the pole, and because of its proximity to the medium, allows greater sensitivity in reading magnetic patterns in the recording medium. As long as the length of the projection is less than about the stated dimension (length measured normal to the medium surface) the sensing element does not break up into domains.

5 Claims, 1 Drawing Sheet

MAGNETORESISTIVE SENSING ELEMENT WITH A PROJECTION FOR ENHANCED DATA READING

BACKGROUND/INFORMATION DISCLOSURE STATEMENT

In modern magnetic data storage systems, actual recording of data is invariably done by a conventional magnetic transducer which converts an electrical signal into changing magnetic flux patterns at the flux gap of the transducer and adjacent a medium in which intricate magnetic patterns may be created. The changing magnetic flux patterns change the local magnetic state of the medium into a pattern in the medium which persists until overwritten. The pattern in the medium can be sensed or read by a variety of devices to create an electrical signal representative of the pattern in the medium and from which the original data can be recreated.

Photolithographic processes can be used to form such transducers, and those so formed are referred to as thin film transducers. Such transducers are built up through deposition layer by layer in great numbers simultaneously on a wafer which is then cut into individual carriers, each having one or two transducers. Each individual carrier then has a bearing surface along which the medium moves, and which is created by the cutting step. These transducers have at least one deposited pole of preselected width projecting toward and approximately flush with the bearing surface of the transducer. The pole defines a flux gap across which is formed the magnetic field for writing the magnetic pattern in the medium. A deposited winding encircling the pole carries write current for generating the write flux across the flux gap. If only a single pole is deposited for a transducer, then the carrier is formed of a magnetic ferrite and forms the other pole. Of course, it is possible to deposit two or more poles, and the flux gap for writing is then formed between them. In this case, the carrier may be formed from magnetic or non-magnetic materials depending on the configuration of the assembly.

One type of sensor for reading data encoded in previously written magnetic data patterns on the medium is a so-called magnetoresistive flux sensing element underlying the deposited pole. Such an element has the special characteristic of electrical resistance which is a function of the impressed magnetism to which such a sensor is exposed. The magnetoresistive sensing element has advantages and disadvantages for this application. One of the disadvantages is that the sensor must be carefully constructed so that it comprises a single domain in the area where the medium's magnetic pattern is sensed, thereby avoiding the Barkhausen noise which is otherwise generated. The Barkhausen noise problem requires careful design of these sensors to allow their proper functioning to sense magnetic patterns. To prevent the breakup of these sensors into a plurality of magnetic domains, among other things it is known to be necessary for the sensing element to physically have relatively straight edges and sides with no sharp angles since these can induce the element to break up into domains. These problems are considered in various discussions of magnetoresistive elements, among these being "Characteristic Length of Domain Structure and Its Effect on the Coercive Force of Ferromagnetic Materials", E. J. Ozimek, J.A.P. 57(12), June 15, 1985, p. 5406 and "Fabrication and Wafer Testing of Barber Pole and Exchange-Biased Narrow Track MR Sensors", IEEE Transactions on Magnetics, Vol. Mag 18, November 1982, pp. 1149–1151.

It is important that the sensor be located as close as possible to the medium and the magnetic patterns in it since these are relatively weak and their field drops off quickly with distance. Because of the single domain requirement and because of the way in which these composite transducers are manufactured, it is preferred that the sensing element be recessed slightly from the edge of the carrier on which the sensor and transducer are mounted. Recessing is needed to permit the write transducer flux gap to be configured to a particular range of dimensions, say by a lapping process, and if the sensing element is not sufficiently recessed, the sensing element can be scratched by the lapping process. These scratches may induce the sensor to break up into domains. These considerations require that the sensing element be accurately positioned on the support so that on the one hand the sensing element is close enough to accurately create the electrical signal during readback, and on the other hand not so close to the edge of the support that it is recessed insufficiently.

Another problem if the sensor is located too close to the edge of the carrier is that adjacent data tracks in the medium will be sensed by the sensor, and this cross talk will reduce the accuracy with which the sensor can reproduce the magnetic pattern in the selected track. By recessing the sensor slightly, the pole(s) serve as a flux path in conducting flux from the medium and the desired track therein to the sensor, at least partly to the exclusion of cross talk from adjacent tracks. Recessing thus alleviates the cross talk problem, but reduces the signal strength and makes the sensor more vulnerable to other noise sources.

BRIEF DESCRIPTION OF THE INVENTION

I have discovered that very small deviations from perfect straightness of the sensing element will not necessarily break it up into domains. In particular, the interference caused by cross talk or other stray flux of such a magnetoresistive flux sensing element can be improved by adding to it a projection extending toward the bearing surface. Such a projection should have a width less than the preselected width of the deposited pole and a length dimension normal to the plane of the bearing surface no greater than approximately 1.5 $\mu$m. Even though such a projection is a deviation from nearly perfect straightness of the sensing element's structure, the dimensional limitation has been found to be sufficient to prevent the sensing element from breaking up into domains. If the projection exceeds the 1.5 $\mu$m limitation appreciably, then the breakup of the sensing element into domains is observed. Preferably, the end of the projection is substantially flush with the bearing surface. This geometry will typically be created by the lapping process which sets the flux gap dimensions. Even though the projection is very short, producing it is well within the capacity of photolithographic processes.

By placing the edge of the projection flush with the bearing surface, or at least closer to the bearing surface than was possible heretofore, higher data densities and data rates are possible. Further, cross talk from adjacent tracks is reduced, and the effects of scratching of the sensor edge during lapping is reduced due to the lesser amount of sensor width exposed to the lap. This increases the capacity of the storage device employing this sensor at essentially no additional increase in price.

DESCRIPTION OF THE PREFERRED EMBODIMENT

Figure 1:
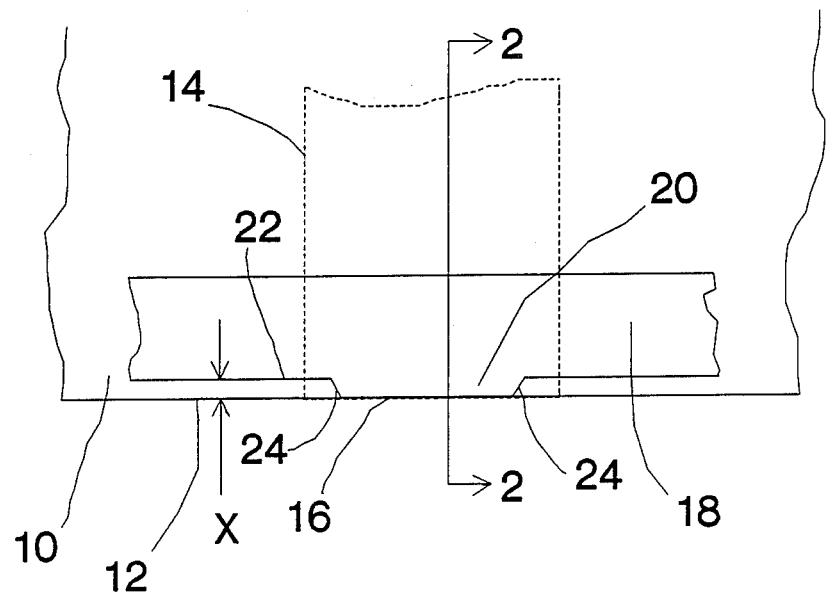
FIG. 1 is a frontal view of the improved magnetoresistive flux sensing element on a portion of its carrier with the deposited pole shown in outline.

In FIG. 1, therein is shown a portion of a carrier 10 for a magnetic data transducer. A bearing surface 12 may be formed by lapping or other machining process. In one embodiment, carrier 10 is formed of magnetic ferrite. A magnetoresistive flux sensing element 18 is firmly attached to the face of carrier 10, and may be formed preferably by photolithographic processes. A photolithographically deposited magnetic pole 14, shown in outline, overlies a part of sensing element 18. Pole 14 is flush with the bearing surface. The "length" of sensing element 18 (dimension normal to the plane of the paper in FIG. 1) is typically 0.01 to 0.1 $\mu$m. and the height as shown in FIG. 1 may be usually from 4 to 20 $\mu$m.

A projection 20 integral with the sensing element 18 underlies pole 14. Projection 20 has a length shown as X, the distance between edge 22 of element 18 and the end 16 of projection 20, where X must not appreciably exceed 1.5 $\mu$m. The width of projection 20 should be less than the width of pole 14. Because of limitations of the photolithographic process, it is not possible to make the sides 24 of projection 20 perpendicular to edge 22. Accordingly, end 16 of projection 20 is narrower than the base of projection 20.

Figure 2:
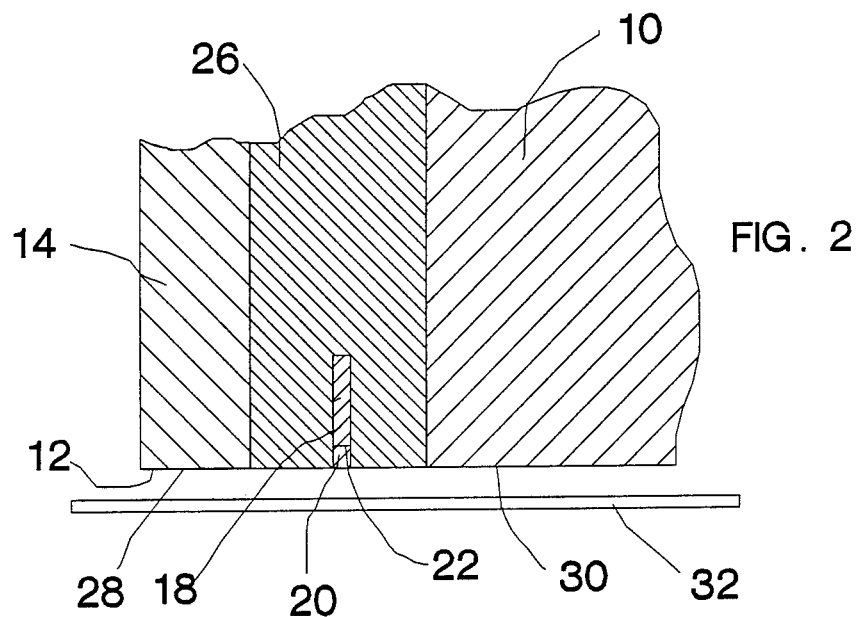
FIG. 2 is a section view of FIG. 1 through the sensing element's projection.

FIG. 2 shows a section view 2—2 of FIG. 1. Note that the length of sensing element 18 is not shown to scale here. The flux gap for writing data on the medium 32 is established between face 30 of carrier 10 and face 28 of pole 14 with insulating layer 28 filling the gap and mechanically spacing pole 14 from carrier 10. Edge 22 is shown as a solid line because of space limitations although strictly speaking since edge 22 is hidden in the section view which FIG. 2 represents, should be a dashed line.

Of course, one or more poles can be deposited on pole 14 with an appropriate gap material between. In this case sensing element 18 can be left in the position shown between pole 14 and carrier 10, or it can be located in the gap material between any two magnetically active poles, for example pole 14 and the pole proposed to be deposited immediately adjacent to pole 14. However the structure is configured, it is important for high bit densities that the sensing element 18 have magnetic material on each of its sides. This is to prevent peak shift caused by interference from bits adjacent the one presently under the sensing element 18.

Insulating layer 26 serves to electrically insulate and physically space pole 14 from carrier 10 so as to create the gap mentioned. Layer 26 typically comprises several individual layers formed by several steps in the fabrication process. Because the individual insulating layers are not relevant to the invention they have not been differentiated in FIG. 2.

The following claims describe my invention.

I claim:

1. In a thin film magnetic data transducer of the type having for writing at least one deposited pole of preselected width projecting toward and approximately flush with a bearing surface of the transducer along which during use a magnetic medium for recording magnetic flux patterns moves; a deposited winding encircling the pole for carrying write current and generating write flux thereby; and a magnetoresistive flux sensing element underlying the deposited pole for reading data encoded in previously written magnetic data patterns on the medium, an improvement to the magnetoresistive flux sensing element comprising under the deposited pole a projection of the magnetoresistive flux sensing element toward the bearing surface, said projection having a width less than the preselected width of the deposited pole and a length dimension normal to the plane of the bearing surface no greater than approximately 1.5 $\mu$m.

2. The magnetoresistive flux sensing element of claim 1 wherein the end of the projection is less wide than the base of the projection.

3. The magnetoresistive flux sensing element of claim 2 wherein the projection tapers in width toward its end.

4. The magnetoresistive flux sensing element of claim 3, wherein the end of the projection is substantially flush with the bearing surface.

5. The magnetoresistive flux sensing element of claim 1, wherein the end of the projection is substantially flush with the bearing surface.

* * * * *